Jan. 17, 1967   C. K. BOWMAN   3,298,091

METHOD OF CENTERING A TOOL IN A TOOL HOLDER

Filed March 5, 1964                         2 Sheets-Sheet 1

INVENTOR
CAROL K. BOWMAN
BY *Frank Groom Kirtz*

ATTORNEY

Jan. 17, 1967  C. K. BOWMAN  3,298,091

METHOD OF CENTERING A TOOL IN A TOOL HOLDER

Filed March 5, 1964  2 Sheets-Sheet 2

INVENTOR
CAROL K. BOWMAN
BY
ATTORNEY

United States Patent Office 3,298,091
Patented Jan. 17, 1967

3,298,091
METHOD OF CENTERING A TOOL IN A TOOL HOLDER
Carol K. Bowman, 107 Pryor Ave.,
Monett, Mo. 65708
Filed Mar. 5, 1964, Ser. No. 349,618
1 Claim. (Cl. 29—406)

This invention relates to an automatic method of centering tools for a lathe. The particular embodiment shown and illustrated in a tool holder for an eight station Hardinge turret lathe, a lathe in wide use throughout the entire United States.

Previous to my invention there has been a great deal of effort expanded in the design of turret lathes and very little in the design of the tool holders for such lathes. In particular the method commonly employed to center drills, taps and the like, although they are of standard size, has been remarkably left to a trial and error technique. First the operator places the tool, let us take as example a simple one inch drill, and places it in the holder and tightens the holder upon the drill. Next he must position the holder upon the turret, or the cross slide on the ordinary engine lathe, in such a position as to approximate centering. Then he brings the turret forward to the workpiece, to check the accuracy of the centering. Next he loosens the holder upon the turret and adjusts its position. Then he tightens the holder and measures again. Each time he loosens the holder and adjusts it, and each time he tightens it, he may inadvertently move it from the exact center position he desires. The entire method is unsatisfactory and a great deal of time is consumed in this practice.

I have invented a method of appyling the tool to the holder which avoids all of the above difficulties. It is no longer a problem to center a tool on a turret or a cross slide. The use of my tool, with no experience, makes it extremely simple for any machine operator to immediately center the tools.

One of the principal objects of my invention is to provide a simple tool holder which will be efficient and free of maintenance for turret lathes.

Another of the objects of my invention is to provide a tool holder which can be used to center tools without any difficult trial and error method.

The above and many related objects of my invention will be apparent to those skilled in the art, from a study of the attached drawings and specification.

Figure 1:
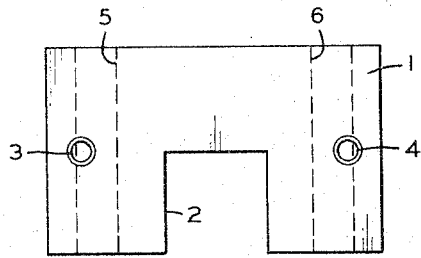
FIG. 1 is a front elevational view of the base of the tool holder.
Figure 2:
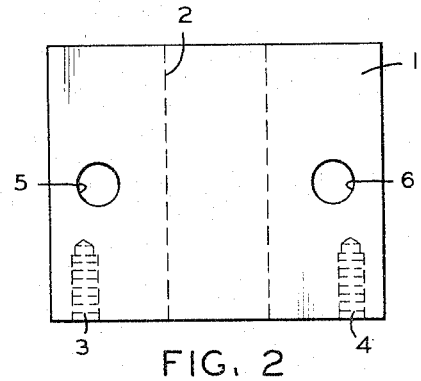
FIG. 2 is a top plan view of the base of the tool holder.
Figure 3:
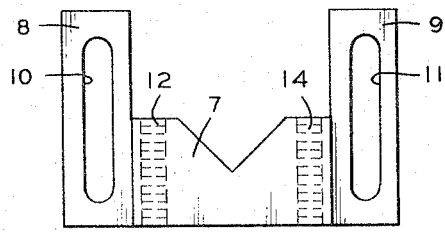
FIG. 3 is a front elevational view of the vertical-sliding bottom V of the tool holder.
Figure 4:
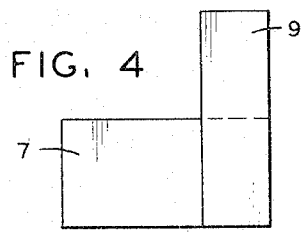
FIG. 4 is a side elevational view of the bottom V of the tool holder.

Referring now in particular to the figures, numeral 1 is applied to the base of the tool holder, shown in FIGS. 1 and 2. Base 1 is rectangular in shape and provided with a central slot 2, which is called the tool slot. It is also provided with two mounting holes 3 and 4, which are tapped. Base 1 is also provided with two transverse bores 5 and 6.

Figure 5:
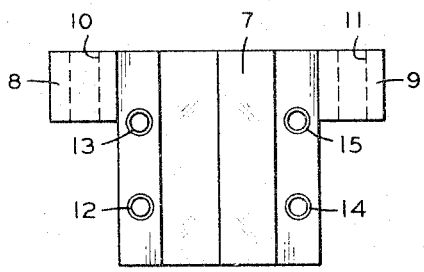
FIG. 5 is a top plan view of the bottom V of the tool holder.
Figure 6:
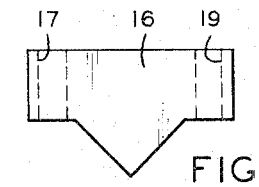
FIG. 6 is a front elevational view of the top V of the tool holder.
Figure 7:
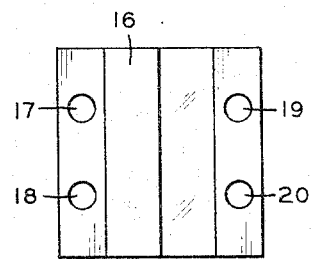
FIG. 7 is a bottom plan view of the top V of the tool holder.

The bottom V block 7 is provided with two side pieces 8 and 9, integral therewith. Each side piece is pierced with a slot, 10 and 11 respectively. The bottom V block is also provided with four tapped holes shown in FIG. 5 and numbered 12, 13, 14 and 15.

The top V block 16 is provided with four matching holes, numbered 17, 18, 19, and 20.

Figure 10:
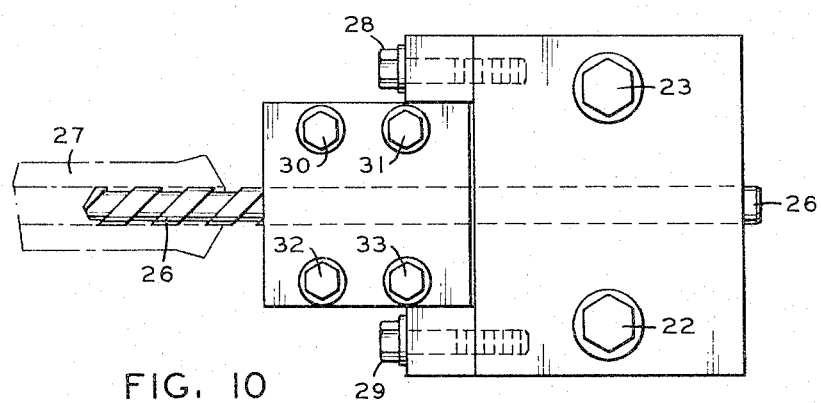
FIG. 10 is a top plan view of the assembled tool holder, holding the tool, and showing the method of centering, including a collet around the tool, it being understood that the collet is held in the spindle or chuck of a turret lathe.

In assembling the bottom V block and the top V block are mounted upon the base 1. However the procedure from there on is different from previous practice. It is best illustrated by reference to FIG. 10. Let us say that a drill is to be centered upon this tool holder. Also let us say that it is a one-half inch drill. We select the one-half inch collet for use in this case. The one-half inch collet is placed in the lathe chuck spindle. We place the tool, in this case the one-half inch drill, in the collet, with the working end facing into and contained by the collet. This is shown in FIG. 10. The collet it then tightened in the spindle and the drill bit is held by nothing but the collet. Of course, we must notice here that the drill is now a centered tool. It is exactly on center and will not hereafter depart from that position. This is the most important step of my invention and is nowhere shown in previous practice in the art.

Figure 9:
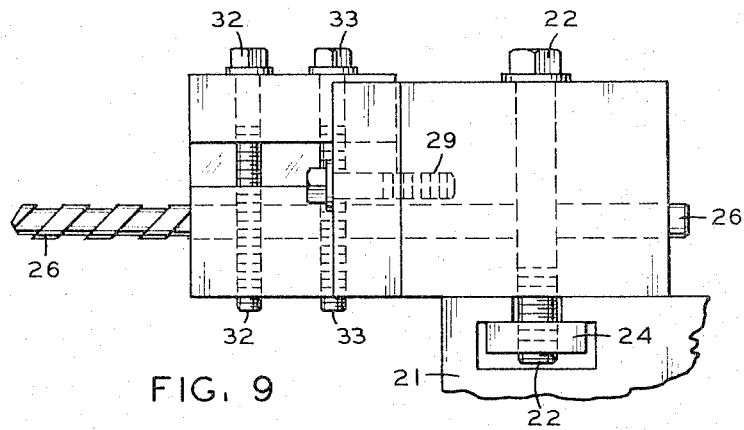
FIG. 9 is a side elevational view of the assembly tool holder, with a tool in position and the tool holder mounted upon the turret of a turret lathe.

Now I assemble my tool holder around the center bit, or tool. First I place the base in position on the turret (or the cross slide in the case of an engine lathe). The turret is shown in a cutaway as 21 in FIG. 9. There it will be seen that the base is held in position by two T slot bolts, 22 and 23, which pass through the base in the mounting holes 5 and 6 and terminating in the nut 24, disposed in the T slot 25 customary in the turret 21.

Figure 8:
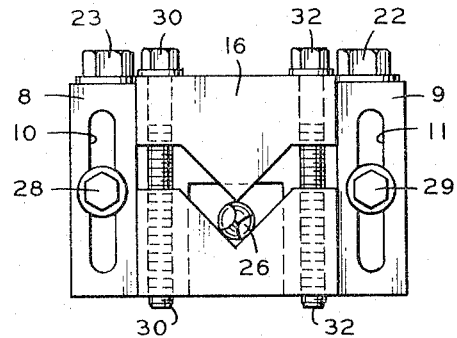
FIG. 8 is a front elevational view of the assembled tool holder.

The tool I number 26 and the collet 27. In FIG. 8 I have omitted the collet so that a clearer view of the front assembly will be shown. Next I assemble the bottom V block and the top V block on the base 1. The bottom V block is held in position by the use of 28, 29, two cap screws, with their appropriate washers. The cap screws 28, 29 pass through the slots 10 and 11 respectively in the side pieces 8 and 9 of the bottom V block. The cap screws 28, 29 are seated in the tapped mounting holes 3, 4 of the base 1.

The top V block is positioned as shown in the figures and held in position by the four cap screws 30, 31, 32, and 33 together with their appropriate washers. The cap screws 30, 31, 32 and 33 pass through the four holes 17, 18, 19 and 20 of the top V block, and through the tapped holes 12, 13, 14 and 15 of the bottom V block.

All of the cap screws are tightened while the parts are assembled around the tool. Next the collet 27 must be removed. I simply run the turret back away from the chuck, after loosening the collet in spindle. The turret, carrying the tightened tool holder assembly, together with the tool in centered position, is run back away from the chuck. Then the loosened collet is removed from the spindle the workpiece is inserted in the chuck and the process of centering the tool in the tool holder is completed.

It will be understood that this above-described procedure will suffice for a great many tools since standard collets are arranged to fit all the standard sizes of tools. In this manner, therefore boring bars, taps drills and a great many other tools may be accommodated.

It will be noted that in a sense my method of centering is a reversal of the customary method. In the customary method, the tool holder is tightened around the tool, and the collet is never used. The operator trys by experiment to center the tool. Each time he approaches the centering a little closer, and by successive approximations he finally approaches the correct position. However the present practice is quite time consuming, and it does not guarantee exact results.

With my method, and my construction, the tool is centered at the beginning. All the steps thereafter serve merely to lock the tool in its already attained centered position. There can be no departure of the tool from the central position. When the collet is removed, the tool remains disposed along the central axis of the chuck, where it was placed at the beginning.

Without further description, it is obvious that many additional advantages are to be had from the disposed embodiment of my invention, as will be apparent to those skilled in the art. It is to be further understood that any and all changes in form, construction and arrangements of parts, to which my invention is susceptible, may be made without departing from the spirit of the invention, or its scope as claimed.

I claim:

The method of automatically centering a tool having a head and a base in a turret lathe tool holder, consisting of placing and holding the head of the tool centered in an appropriately sized collet in the lathe chuck spindle of said lathe, then tightening the collet in said spindle to fix firmly said tool exactly on center, next assembling the parts of the tool holder of said turret lathe around the base of the centered tool, then tightening said parts of the tool holder on said tool base while the parts are assembled around the tool base, then loosening the collet, and then removing the loosened collet from its position around the head of said tool and from the spindle of said lathe.

References Cited by the Examiner
UNITED STATES PATENTS

| | | | |
|---|---|---|---|
| 2,277,613 | 3/1942 | Swenson | 29—406 |
| 2,348,908 | 5/1944 | Jacobs | 29—406 X |
| 2,504,642 | 4/1950 | Burgess | 29—465 |
| 2,930,115 | 3/1960 | Dietzch et al. | 29—407 X |

JOHN F. CAMPBELL, *Primary Examiner.*

THOMAS H. EAGER, *Examiner.*